United States Patent
Johnson

(10) Patent No.: US 10,380,649 B2
(45) Date of Patent: Aug. 13, 2019

(54) SYSTEM AND METHOD FOR LOGISTIC MATRIX FACTORIZATION OF IMPLICIT FEEDBACK DATA, AND APPLICATION TO MEDIA ENVIRONMENTS

(71) Applicant: SPOTIFY AB, Stockholm (SE)

(72) Inventor: Christopher Johnson, New York City, NY (US)

(73) Assignee: SPOTIFY AB, Stockholm (SE)

( * ) Notice: Subject to any disclaimer, the term of this patent is extended or adjusted under 35 U.S.C. 154(b) by 788 days.

(21) Appl. No.: 14/637,209

(22) Filed: Mar. 3, 2015

(65) Prior Publication Data

US 2015/0248618 A1     Sep. 3, 2015

Related U.S. Application Data

(60) Provisional application No. 61/947,262, filed on Mar. 3, 2014.

(51) Int. Cl.

| | |
|---|---|
| *G06N 7/02* | (2006.01) |
| *G06N 7/04* | (2006.01) |
| *G06N 7/06* | (2006.01) |
| *G06N 7/08* | (2006.01) |
| *G06Q 30/02* | (2012.01) |
| *G06F 16/635* | (2019.01) |

(52) U.S. Cl.
CPC ....... *G06Q 30/0271* (2013.01); *G06F 16/635* (2019.01)

(58) Field of Classification Search
CPC .................. G06Q 30/0271; G06F 17/30761
See application file for complete search history.

(56) References Cited

U.S. PATENT DOCUMENTS

| | | |
|---|---|---|
| 5,872,850 A | 2/1999 | Klein et al. |
| 7,398,274 B2 | 7/2008 | Ittycheriah et al. |
| (Continued) | | |

FOREIGN PATENT DOCUMENTS

| | | |
|---|---|---|
| EP | 2312516 A1 | 4/2011 |
| WO | 2012107762 A1 | 8/2012 |

OTHER PUBLICATIONS

Wikipedia, "Collaborative filtering; https://en.wikipedia.org/wiki/Collaborative_filtering", captured on Jul. 3, 2015; retrieved from http://web.archive.org/web/20150703051148/https://en.wikipedia.org/wiki/Collaborative_filtering on Feb. 6, 2019, 8 pages.

(Continued)

*Primary Examiner* — Scott A. Waldron
*Assistant Examiner* — Ababacar Seck
(74) *Attorney, Agent, or Firm* — Merchant & Gould P.C.

(57) ABSTRACT

In accordance with an embodiment, described herein is a system and method for logistic matrix factorization of implicit feedback data, with application to media environments or streaming services. While users interact with an environment or service, for example a music streaming service, usage data reflecting implicit feedback can be collected in an observation matrix. A logistic function can be used to determine latent factors that indicate whether particular users are likely to prefer particular items. Exemplary use cases include providing personalized recommendations, such as personalized music recommendations, or generating playlists of popular artists.

20 Claims, 8 Drawing Sheets

(56) References Cited

U.S. PATENT DOCUMENTS

| | | | |
|---|---|---|---|
| 7,627,605 | B1 | 12/2009 | Lamere et al. |
| 7,797,446 | B2 | 9/2010 | Heller et al. |
| 7,849,092 | B2 | 12/2010 | Slaney et al. |
| 8,306,976 | B2 | 11/2012 | Handman et al. |
| 8,370,351 | B2 | 2/2013 | Kalasapur et al. |
| 8,407,226 | B1* | 3/2013 | Das ................ G06F 17/30867 707/739 |
| 8,473,368 | B2 | 6/2013 | Gronow et al. |
| 8,874,574 | B2 | 10/2014 | Purdy |
| 9,110,955 | B1 | 8/2015 | Bernhardsson |
| 2002/0019858 | A1 | 2/2002 | Kaiser et al. |
| 2006/0015193 | A1 | 1/2006 | Kato |
| 2009/0034750 | A1 | 2/2009 | Ayoub et al. |
| 2009/0037355 | A1 | 2/2009 | Brave et al. |
| 2011/0153663 | A1* | 6/2011 | Koren ............... G06F 17/30964 707/776 |
| 2011/0295843 | A1 | 12/2011 | Ingrassia et al. |
| 2012/0030020 | A1* | 2/2012 | Bucak .................. G06Q 30/02 705/14.53 |
| 2012/0059788 | A1 | 3/2012 | Sekino |
| 2012/0078830 | A1* | 3/2012 | Bodor .................. G06Q 30/02 706/46 |
| 2012/0303713 | A1 | 11/2012 | Harbick et al. |
| 2013/0159243 | A1 | 6/2013 | Wei et al. |
| 2013/0262469 | A1 | 10/2013 | Whitman |
| 2013/0311163 | A1 | 11/2013 | Somekh et al. |
| 2013/0332842 | A1 | 12/2013 | Bernhardsson et al. |
| 2014/0129500 | A1 | 5/2014 | Nice et al. |
| 2014/0214751 | A1 | 7/2014 | Damera-Venkata |
| 2014/0280181 | A1 | 9/2014 | Rodger et al. |
| 2015/0248618 | A1 | 9/2015 | Johnson |
| 2016/0328409 | A1 | 11/2016 | Ogle et al. |
| 2016/0335266 | A1 | 11/2016 | Ogle et al. |

OTHER PUBLICATIONS

Dato, "GraphLab Factorization Recommender; https://dato.com/products/create/docs/generated/graphlab.recommender.factorization_recommender.FactorizationRecommender.html" captured on Sep. 30, 2015; retrieved from "https://web.archive.org/web/20150508070324/http://dato.com/products/create/docs/generated/graphlab.recommender.factorization_recommender.FactorizationRecommender.html", 3 pages.

The Echo Nest, "Acoustic Attributes Overview; http://developer.echonest.com:80/acoustic-attributes.html", captured on Oct. 27, 2015; retrieved from "https://web.archive.org/web/20151027062454/http://developer.echonest.com:80/acoustic-attributes.html" on Feb. 6, 2019, 2 pages.

Google, "Word2vec; https://code.google.com/p/word2vec/", captured on Jan. 22, 2016; retrieved from "https://web.archive.org/web/20160122041211/https://code.google.com/p/word2vec/" on Feb. 6, 2019, 5 pages.

Hu, et al., "Collaborative Filtering for Implicit Feedback Datasets", Data Mining 2008, ICDM Eighth IEEE International Conference, Dec. 15-19, 2008, pp. 263-272, 10 pages.

International Search Report in connection with PCT Application No. PCT/US2016/042821, dated Aug. 31, 2016, 3 pages.

International Search Report and Written Opinion of the International Search Authority in connection with PCT Application No. PCT/US2016/042830, dated Sep. 6, 2016, 13 pages.

Johnson, Christopher C., "Logistic Matrix Factorization for Implicit Feedback Data", Conference on Neural Information Processing Systems 2014, 9 pages.

Koren, et al., "Matrix Factorization Techniques for Recommender Systems", Computer, Issue 8, IEEE Computer Society, Aug. 2009, pp. 42-49, 8 pages.

O'Mahony, et al., "Detecting Noise in Recommender System Databases", Proceedings of the 11th International Conference on Intelligent User Interfaces, Sydney, Australia, Jan. 29-Feb. 1, 2006, pp. 109-115, 7 pages.

Rendle, Steffen, "Factorization Machines", ICDM '10, Proceedings of the 2010 IEEE International Conference on Data Mining, Dec. 13, 2010, pp. 995-1000, 6 pages.

Scikit-learn, "Generalized Linear Models—scikit-learn 0.17 documentation; http://scikit-learn.org:80/stable/modules/linear_model.html", captured on Feb. 1, 2016; retrieved from "https://web.archive.org/web/20160201220706/http://scikit-learn.org:80/stable/modules/linear_model.html" on Feb. 6, 2019, 26 pages.

United States Patent and Trademark Office, Office Action dated Dec. 22, 2016, in connection with U.S. Appl. No. 15/212,961, 18 pages.

United States Patent and Trademark Office, Office Action dated Jun. 15, 2017, in connection with U.S. Appl. No. 15/212,961, 25 pages.

United States Patent and Trademark Office, Office Action dated Sep. 26, 2018, in connection with U.S. Appl. No. 15/212,961, 13 pages.

* cited by examiner

```
import time
import numpy as np def load_matrix(filename, num_users, num_items):
    t0 = time.time()
    counts = np.zeros((num_users, num_items))
    total = 0.0
    num_zeros = num_users * num_items
    for i, line in enumerate(open(filename, 'r')):
        user, item, count = line.strip().split('\t')
        user = int(user)
        item = int(item)
        count = float(count)
        counts[user][item] = count
        total = count
        num_zeros -= 1
    alpha = num_zeros / total
    print 'alpha %.2f' % alpha
    counts *= alpha
    t1 = time.time()
    print 'Finished loading matrix in %f seconds' % (t1 - t0)
    return counts class LogisticMF():

def __init__(self, counts, num_factors, reg_param=0.6, gamma=1.0, iterations=30):
        self.counts = counts
        self.num_users = counts.shape[0]
        self.num_items = counts.shape[1]
        self.num_factors = num_factors
        self.iterations = iterations
        self.reg_param = reg_param
        self.gamma = gamma def train_model(self):

self.ones = np.ones((self.num_users, self.num_items))
        self.user_vectors = np.random.normal(size=(self.num_users, self.num_factors))
        self.item_vectors = np.random.normal(size=(self.num_items, self.num_factors))
        self.user_biases = np.random.normal(size=(self.num_users, 1))
        self.item_biases = np.random.normal(size=(self.num_items, 1))

user_vec_deriv_sum = np.zeros((self.num_users, self.num_factors))
```

*FIGURE 6A*

```
        item_vec_deriv_sum = np.zeros((self.num_items, self.num_factors))
        user_bias_deriv_sum = np.zeros((self.num_users, 1))
        item_bias_deriv_sum = np.zeros((self.num_items, 1))
        for i in range(self.iterations):
            t0 = time.time()
            # Fix items and solve for users
            # take step towards gradient of deriv of log likelihood
            # we take a step in positive direction because we are maximizing LL
            user_vec_deriv, user_bias_deriv = self.deriv(True)
            user_vec_deriv_sum += np.square(user_vec_deriv)
            user_bias_deriv_sum += np.square(user_bias_deriv)
            vec_step_size = self.gamma / np.sqrt(user_vec_deriv_sum)
            bias_step_size = self.gamma / np.sqrt(user_bias_deriv_sum)
            self.user_vectors != vec_step_size * user_vec_deriv
            self.user_biases -= bias_step_size * user_bias_deriv

# Fix users and solve for items
            # take step towards gradient of deriv of log likelihood
            # we take a step in positive direction because we are maximizing LL
            item_vec_deriv, item_bias_deriv = self.deriv(False)
            item_vec_deriv_sum += np.square(item_vec_deriv)
            item_bias_deriv_sum += np.square(item_bias_deriv)
            vec_step_size = self.gamma / np.sqrt(item_vec_deriv_sum)
            bias_step_size = self.gamma / np.sqrt(item_bias_deriv_sum)
            self.item_vectors != vec_step_size * item_vec_deriv
            self.item_biases -= bias_step_size * item_bias_deriv
            t1 = time.time()

print 'iteration %i finished in %f seconds' % (i + 1, t1 - t0)

def deriv(self, user):
        if user:
            vec_deriv = np.dot(self.counts, self.item_vectors)
            bias_deriv = np.expand_dims(np.sum(self.counts, axis=1), 1)

else:
            vec_deriv = np.dot(self.counts.T, self.user_vectors)
            bias_deriv = np.expand_dims(np.sum(self.counts, axis=0), 1)
        A = np.dot(self.user_vectors, self.item_vectors.T)
        A += self.user_biases
        A += self.item_biases.T
        A = np.exp(A)
        A /= (A + self.ones)
        A = (self.counts + self.ones) * A
```

*FIGURE 6B*

```
    if user:
        vec_deriv -= np.dot(A, self.item_vectors)
        bias_deriv -= np.expand_dims(np.sum(A, axis=1), 1)
        # L2 regularization
        vec_deriv -= self.reg_param * self.user_vectors
    else:
        vec_deriv -= np.dot(A.T, self.user_vectors)
        bias_deriv -= np.expand_dims(np.sum(A, axis=0), 1)
        # L2 regularization
        vec_deriv -= self.reg_param * self.item_vectors
    return (vec_deriv, bias_deriv)

def log_likelihood(self):
    loglik = 0
    A = np.dot(self.user_vectors, self.item_vectors.T)
    A += self.user_biases
    A += self.item_biases.T
    B = A * self.counts
    loglik += np.sum(B)

A = np.exp(A)
    A += self.ones

A = np.log(A)
    A = (self.counts + self.ones) * A
    loglik -= np.sum(A)

# L2 regularization
    loglik -= 0.5 * self.reg_param * np.sum(np.square(self.user_vectors))
    loglik -= 0.5 * self.reg_param * np.sum(np.square(self.item_vectors))
    return loglik def print_vectors(self):
    user_vecs_file = open('logmf-user-vecs-%i' % self.num_factors, 'w')
    for i in range(self.num_users):
        vec = ' '.join(map(str, self.user_vectors[i]))
        line = '%i\t%s\n' % (i, vec)
        user_vecs_file.write(line)
    user_vecs_file.close()
    item_vecs_file = open('logmf-item-vecs-%i' % self.num_factors, 'w')
    for i in range(self.num_items):
        vec = ' '.join(map(str, self.item_vectors[i]))
        line = '%i\t%s\n' % (i, vec)
        item_vecs_file.write(line)
    item_vecs_file.close()
```

*FIGURE 6C*

SYSTEM AND METHOD FOR LOGISTIC MATRIX FACTORIZATION OF IMPLICIT FEEDBACK DATA, AND APPLICATION TO MEDIA ENVIRONMENTS

CLAIM OF PRIORITY

This application claims the benefit of priority to U.S. Provisional Patent Application No. 61/947,262, titled "SYSTEM AND METHOD FOR LOGISTIC MATRIX FACTORIZATION FOR IMPLICIT FEEDBACK DATA", filed Mar. 3, 2014; which is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to recommender systems and collaborative filtering, and are particularly related to logistic matrix factorization of implicit feedback data, with application to media environments or streaming services.

BACKGROUND

Users of modern e-commerce services are often presented with a myriad of product choices. To enhance the user experience, recommender systems can be used in conjunction with such services to provide personalized recommendations. A recommender system can be content-based, such that it examines features directly associated with users and products, for example a user's age or the release date of a music album; or can be based on collaborative filtering, such that it examines users' past behaviors or feedback to predict how users might act in the future. However, explicit feedback data, such as user-provided ratings, can be difficult to obtain. Additionally, there is increased interest in the use of implicit feedback data, such as click-throughs, which can be collected faster and with greater scale, and without requiring users to provide an explicit indication of sentiment.

SUMMARY

In accordance with an embodiment, described herein is a system and method for logistic matrix factorization of implicit feedback data, with application to media environments or streaming services. While users interact with an environment or service, for example a music streaming service, usage data reflecting implicit feedback can be collected in an observation matrix. A logistic function can be used to determine latent factors that indicate whether particular users are likely to prefer particular items. Exemplary use cases include providing personalized recommendations, such as personalized music recommendations, or generating playlists of popular artists.

BRIEF DESCRIPTION OF THE FIGURES

FIG. 6A-6C illustrates an example software code for enabling logistic matrix factorization for implicit feedback data, in accordance with an embodiment.

DETAILED DESCRIPTION

Figure 1:
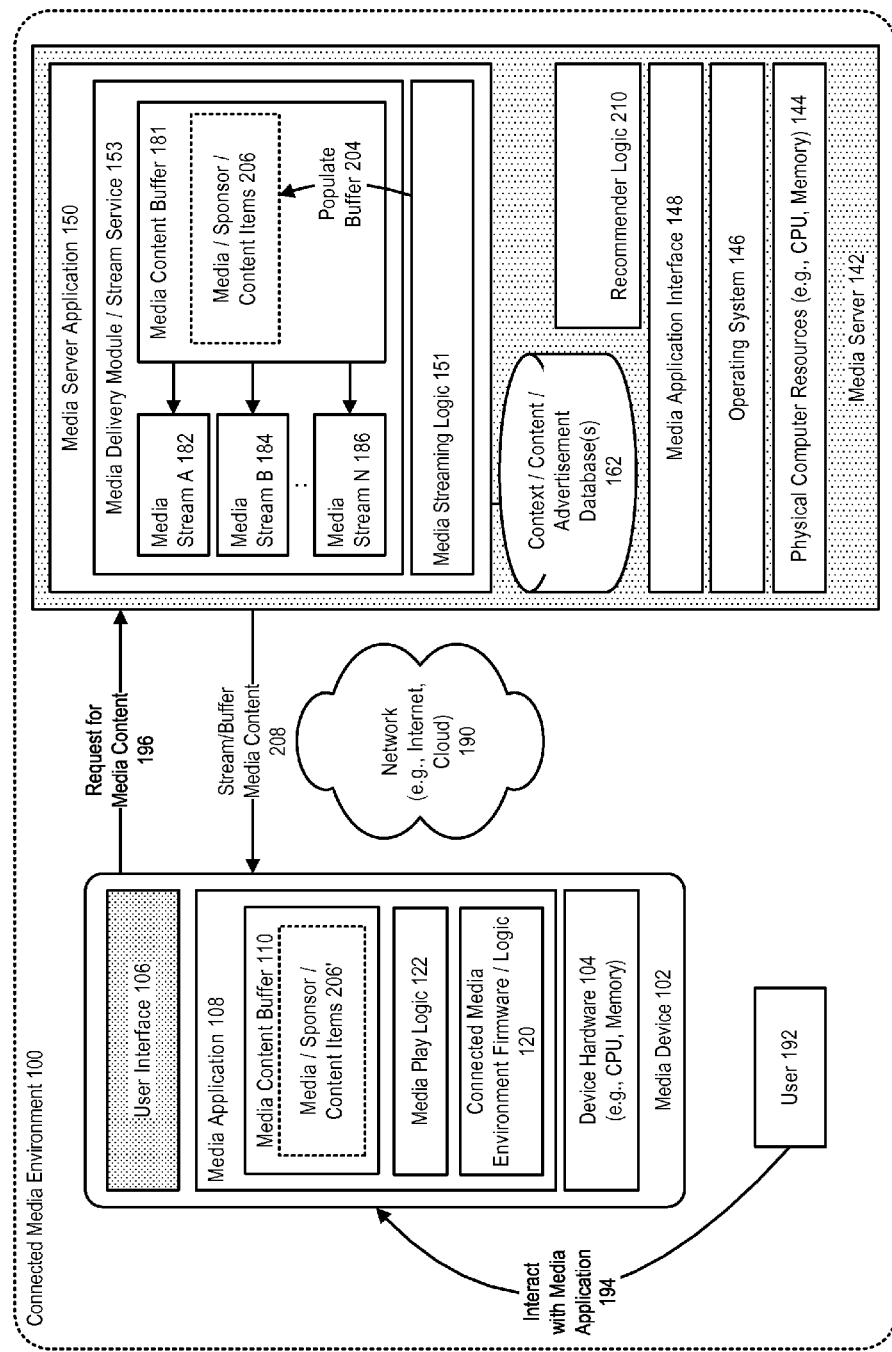
FIG. 1 illustrates a media environment which can use logistic matrix factorization for implicit feedback data, in accordance with an embodiment.

As described above, recommender systems can be used in conjunction with e-commerce services to provide personalized recommendations. However, explicit feedback data, such as user-provided ratings, can be difficult to obtain. Additionally, there is increased interest in the use of implicit feedback data, such as click-throughs, which can be collected faster and with greater scale, and without requiring users to provide an explicit indication of sentiment.

In accordance with an embodiment, described herein is a system and method for logistic matrix factorization of implicit feedback data, with application to media environments or streaming services. While users interact with an environment or service, for example a music streaming service, usage data reflecting implicit feedback can be collected in an observation matrix. A logistic function can be used to determine latent factors that indicate whether particular users are likely to prefer particular items. Exemplary use cases include providing personalized recommendations, such as personalized music recommendations, or generating playlists of popular artists.

In accordance with an embodiment, each entry in the observation matrix represents the number of times that a particular user has interacted with a particular item. For example, if $U=(u_1, \ldots, u_n)$ is a group of n users, and $I=(i_1, \ldots, i_m)$ is a group of m items, then an observation matrix $R=(r_{ui})_{n \times m}$ can be determined wherein each entry $r_{ui} \in R \geq 0$ represents the number of times that user u has interacted with item i.

In accordance with an embodiment, the observation matrix can be factorized by lower-dimensional matrices $X_{n \times f}$ and $Y_{m \times f}$ wherein f is a number of latent factors, the rows of X are latent factor vectors that represent a user's taste, and the columns of $Y^T$ are latent factor vectors that represent an item's implicit characteristics. The user and item vectors can be initially configured with random noise, and an alternating gradient ascent procedure performed, including alternating between solving for the vectors while modifying the observation matrix according to a gradient. During each iteration, the system can solve for item vectors using solved user vectors, and solve for user vectors using solved item vectors. After completing a number of iterations, latent factors can be determined for users and items. The latent factors can then be used to determine recommendations, for example one or more items for a user with which they have not yet interacted, i.e., for which $r_{ui}=0$, but which they are likely to enjoy based on the latent factors.

In accordance with an embodiment, the process can be adapted for parallel processing and for scale, including sharding the observation matrix and vectors into partitions, working locally with each partition using a data collection and aggregation processor, such as an Apache Hadoop environment, and then joining or otherwise combining the results of each partition.

Media Environments

In accordance with an embodiment, a media environment or streaming service which enables users to select a media device to stream, play, or otherwise access a particular media content, can utilize logistic matrix factorization of implicit feedback data to enhance the user experience.

FIG. 1 illustrates a media environment which can use logistic matrix factorization for implicit feedback data, in accordance with an embodiment. As shown in FIG. 1, in a connected media environment 100, for example a Spotify Connect environment, a media device 102 operating as a client, can receive and play media content provided by a media server 142 operating as a backend server system. Examples of media devices include personal computer systems, handheld entertainment devices, tablet devices, smartphones, televisions, audio speakers, in-car entertainment systems, or other types of electronic or media device adapted or able to prepare, control the presentation of, and/or play media content, for example, music, video, or television content.

In accordance with an embodiment, the media device and media server can include physical device or computer hardware resources 104, 144, such as one or more processors (CPU), physical memory, network components, or other types of hardware resources. The media device can optionally include a user interface 106, which is adapted to display media options and to determine a user interaction or input, for example to download, stream or otherwise provide access to a corresponding particular media content item. The media device can further include a media application 108, together with an in-memory media content buffer 110, and media play logic 122, which controls the playback of media content received from the media server, for playing either at a requesting client device, or at a controlled client device. A connected media environment firmware or logic 120 enables the media device to participate within the media environment.

In accordance with an embodiment, the media server can be provided at a computer system, including an operating system 146 or other processing environment which supports execution of a media server application 150 that can be used, for example, to stream music, video, or other forms of media content to a media device. The media server can provide a service which enables a media device to communicate with and to receive media content from the media server, in the form of media-access requests. A media application interface 148 can receive requests from media devices, or from other systems, to retrieve media content from the media server. Databases 162 can include a context database that stores data associated with the presentation of media content by a particular media device; a media content database that stores media content such as music, songs, videos, movies, or other types of media content; and an advertisement database that stores advertisement or sponsor-directed content. A media streaming logic 151 can retrieve or otherwise provide access to media content items, in response to requests from media devices or other systems, and populate a media content buffer 181, at a media delivery module or stream service 153, with streams 182, 184, 186 of corresponding media content data, which can then be returned to the requesting device or controlled device.

In accordance with an embodiment, media devices and media servers can communicate with one another using a network, for example the Internet 190. A user 192 can interact 194 with the media application at a media device, and issue requests to access media content. For example, the user's selection of a particular media option can be communicated 196 to the media server, via its media application interface. In response, the media server can populate 204 its media content buffer with corresponding items of media or sponsor-directed content 206, for example as one or more streams of media content and/or advertisement or other sponsor-directed content. The media server can then communicate 208 the selected media content to the user's media device, or to the controlled device as appropriate, where optionally it can be buffered (206') in the media content buffer, for subsequent playing at the device.

In accordance with an embodiment, a recommender logic 210 can provide recommendations to a user based on logistic matrix factorization of implicit feedback, as described in further detail below.

Figure 2:
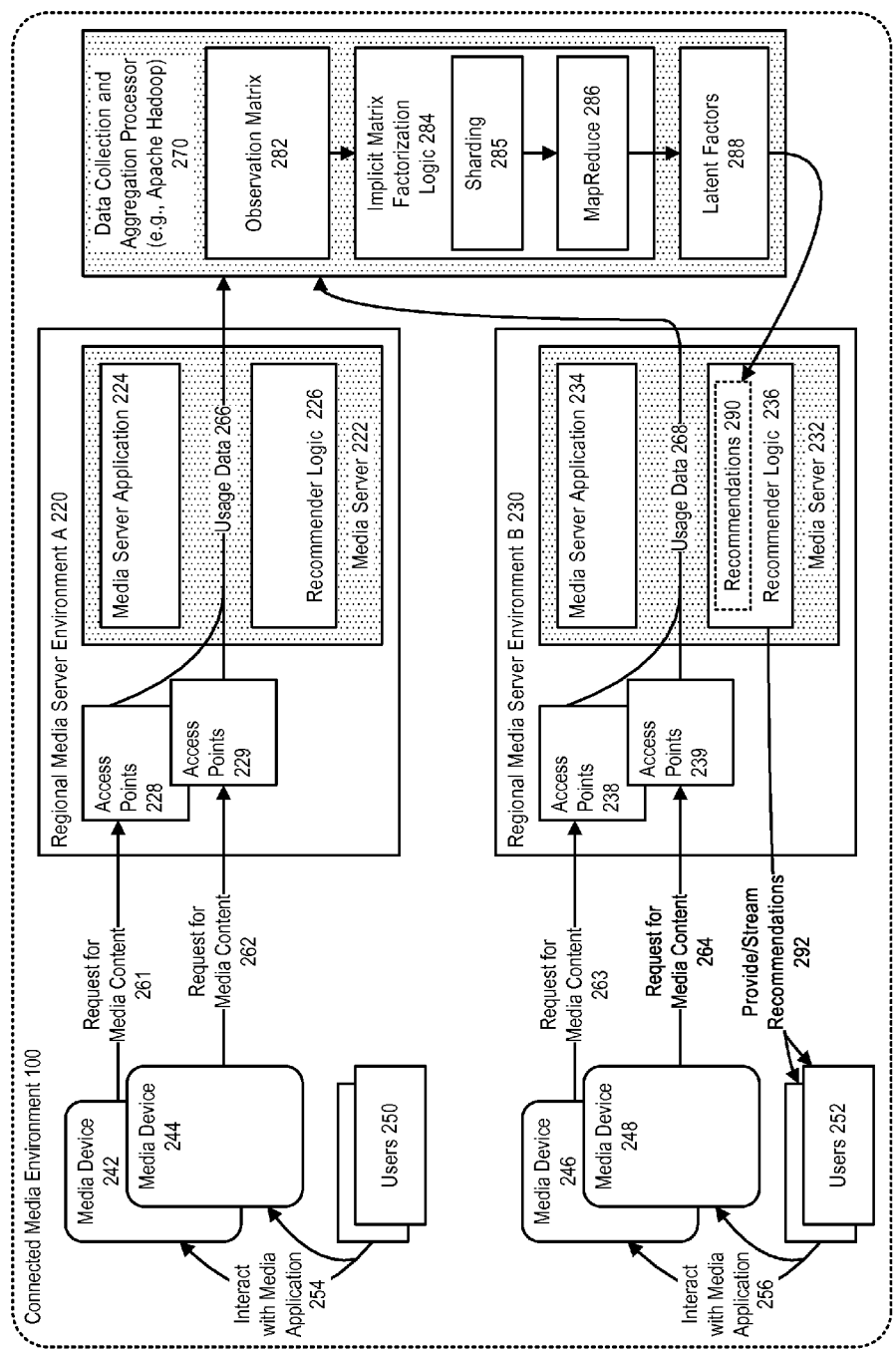
FIG. 2 illustrates a system for logistic matrix factorization of implicit feedback data, in accordance with an embodiment.

FIG. 2 illustrates a system for logistic matrix factorization of implicit feedback data, in accordance with an embodiment. As shown in FIG. 2, a data collection and aggregation processor 270 (e.g., an Apache Hadoop environment) that is capable of receiving and processing usage data from one or more regional media server environments enables collection of usage data from one or more regional media server environments A 220 and B 230. Each regional media server environment includes a media server 222, 232, media server application 224, 234, and recommender logic 226, 236, and supports the use of access points 228, 229, 238, 239, that enable access by media devices 242, 244, 246 248, and users thereof.

In accordance with an embodiment, while users 250, 252 use a media server within a regional media server environment, for example by interacting 254, 256 with a media application playlist or a search function to retrieve, play, stream, or otherwise request media content items 261, 262, 263, 264, usage data 266, 268 can be collected and provided to the data collection and aggregation processor. An observation matrix 282 can be determined, and processed by an implicit matrix factorization logic 284, optionally including sharding 285 and MapReduce 286 functionality as appropriate, for use in determining latent factors 288. The latent factors can be used to configure a recommender logic with recommendations 290, which can be provided or streamed 292 to users as appropriate, including for example one or more items for a user with which they have not yet interacted, but which they are likely to enjoy based on the latent factors.

The Spotify Connect environment is generally described herein as an illustrative example of a media environment or streaming service which can utilize logistic matrix factorization of implicit feedback data. In accordance with other embodiments the techniques described herein can also be used with other types of media environment or streaming service.

Collaborative Filtering

As described above, recommender systems can be used in conjunction with e-commerce services to provide personalized recommendations. However, explicit feedback data, such as user-provided ratings, can be difficult to obtain. Additionally, there is increased interest in the use of implicit feedback data, such as click-throughs, which can be collected faster and with greater scale, and without requiring users to provide an explicit indication of sentiment.

Collaborative filtering techniques can be used to examine users' past behaviors or feedback, including implicit feedback, to predict how users might act in the future. A context-aware model takes into account the context with which users provide implicit feedback, such as the time of day, day of the week, or location. A probabilistic model considers the probability of a user choosing to interact with an item, for example by modelling the distribution of an explicit ratings matrix, given user and item latent factor vectors, as being distributed according to a Gaussian or other distribution. Models may adopt a neighborhood-based approach, which generally focuses on the relationships between users or between items, and attempts to provide recommendations based on ratings of neighboring items by a same user. Alternatively, a latent factor approach attempts to characterize users and items based on multiple factors inferred from the usage patterns.

Matrix factorization models are a popular choice for recommender systems that include latent factor models, due to their simplicity, superior performance to neighborhood based methods, and ability to incorporate additional information.

In accordance with an embodiment, a user's past behavior can be analyzed in order to predict how they will act in the future. Implicit feedback can be provided in many forms, for example click-throughs, page views, or media streaming counts, but in all cases it can be assumed that there is a set of non-negative feedback values associated with each pair of users and items. If $U=(u_1, \ldots, u_n)$ is a group of n users, and $I=(i_1, \ldots, i_m)$ is a group of m items, then an observation matrix $R=(r_{ui})_{n \times m}$ can be determined wherein each entry $r_{ui} \in R \geq 0$ represents the number of times that user u has interacted with item i.

The $r_{ui}$ values are not required to be integers, but instead can be any non-negative real values, to support contextual or temporal weighting of observations. For example, in the case of a music streaming service such as Spotify, explicit clicks by a user may be weighted by a higher weight than streams without explicit clicks. As another example, more recent user streams may be weighted higher than older streams, since a user's taste may change slightly over time.

In most cases the observation matrix R is a very sparse matrix, since most users only interact with a small number of items in I. For any entries $r_{ui}$ where user u does not interact with item i the system can place 0's. Using this approach, a value of 0 does not necessarily imply that the user does not prefer the item, but could simply imply that the user does not know about the item. The system can then be used, for example, to find the top recommended items for each user for each item that they have not yet interacted with (i.e., where $r_{ui}=0$).

In accordance with an embodiment, the observation matrix can be factorized by lower-dimensional matrices $X_{n \times f}$ and $Y_{m \times f}$ wherein f is a number of latent factors, the rows of X are latent factor vectors that represent a user's taste, and the columns of $Y^T$ are latent factor vectors that represent an item's implicit characteristics.

In accordance with an embodiment, this relationship can be modeled by a logistic function. If $l_{u,i}$ denotes the event that user u has chosen to interact with item i (i.e., user u prefers item i), then the probability of this event occurring can be distributed according to a logistic function parameterized by the sum of the inner product of user and item latent factor vectors, and user and item biases:

$$p(l_{ui} \mid x_u, y_i, \beta_i, \beta_j) = \frac{\exp(x_i y_i^T + \beta_u + \beta_i)}{1 + \exp(x_u y_i^T + \beta_u + \beta_i)}$$

In accordance with an embodiment, the $\beta_i$ and $\beta_j$ terms represent user and item biases which account for variation in behavior across both users and items. Some users may have a tendency to interact with a diverse assortment of items in I, while others may only interact with a small subset. Similarly, some items may be very popular and have a high expectation of being interacted with across a broad audience, while other items may be less popular and only apply to a niche group. The bias terms are latent factors associated with each user $u \in U$ and item $i \in I$ that offset the behavior and popularity biases. Given this formulation, the non-zero entries of the observation matrix $r_{ui} \neq 0$ represent positive observations, and the zero entries $r_{ui}=0$ represent negative observations. Additionally, a measure of confidence in the entries of R can be defined, where $\alpha$ is a tuning parameter, as:

$$c = \alpha r_{ui}$$

Each nonzero element $r_{ui} \neq 0$ serves as $c = \alpha r_{ui}$ positive observations, and each zero element $r_{ui}=0$ serves as a single negative observation. Increasing $\alpha$ places more weight on the non-zero entries, while decreasing $\alpha$ places more weight on the zero entries. Choosing $\alpha$ to balance the positive and negative observations generally yields better results. In accordance with other embodiments, other confidence functions can replace c. To remove the power user bias that comes from a dataset where a small minority of users contribute the majority of the weight, a log scaling function can be used, such as:

$$c = 1 + \alpha \log(1 + r_{ui}/\epsilon)$$

By making the assumption that all entries of R are independent, the system can derive the likelihood of observations R given the parameters X, Y, and $\beta$ as:

$$\mathcal{L}(R \mid X, Y, \beta) = \prod_{u,i} p(l_{ui} \mid x_u, y_i, \beta_u, \beta_i)^{\alpha r_{ui}} (1 - p(l_{ui} \mid x_u, y_i, \beta_u, \beta_i))$$

In accordance with an embodiment, zero-mean spherical Gaussian priors can be placed on the user and item latent factor vectors to regularize the model and avoid over-fitting to the training data:

$$p(X \mid \sigma^3) = \prod_u \mathcal{N}(x_u \mid 0, \sigma_u^2 I), \; p(Y \mid \sigma^2)$$
$$= \prod_i \mathcal{N}(y_i \mid 0, \sigma_i^2 I)$$

Taking the log of the posterior, and replacing constant terms with a scaling parameter $\lambda$, the following can be determined:

$$\log p(X, Y, \beta \mid R) = \sum_{u,i} \alpha r_{ui}(x_u y_i^T + \beta_u + \beta_i) -$$
$$(1 + \alpha r_{ui})\log(1 + \exp(x_u y_i^T + \beta_u + \beta_i)) - \frac{\lambda}{2}\|x_u\|^2 - \frac{\lambda}{2}\|y_i\|^2$$

Then, the process can attempt to learn the X, Y, and $\beta$ that maximize the log posterior. A local maximum of the objective defined below can be found by performing an alternating gradient ascent procedure:

$$\underset{U,V,\beta}{\mathrm{argmax}} \log p(X, Y, \beta \mid R)$$

In accordance with an embodiment, in each iteration the system first fixes the user vectors X and biases β, and takes a step towards the gradient of the item vectors Y and biases β. Next, the system fixes the item vectors Y and biases β, and takes a step towards the gradient of the user vectors X and biases β. The partial derivatives for the user vectors and biases can be given by:

$$\frac{\partial}{\partial x_u} = \sum_i \alpha r_{ui} y_i - \frac{y_i(1 + \alpha r_{ui})\exp(x_u y_i^T + \beta_u + \beta_i)}{1 + \exp(x_u y_i^T + \beta_u + \beta_i)}$$

$$\frac{\partial}{\partial \beta_u} = \sum_i \alpha r_{ui} - \frac{(1 + \alpha r_{ui})\exp(x_u y_i^T + \beta_u + \beta_i)}{1 + \exp(x_u y_i^T + \beta_u + \beta_i)}$$

Each iteration is linear in the number of users |U| and items |I|, which for larger domains this can become a limitation. In situations where linear computation is not possible, then fewer negative samples ($r_{ui}=0$) can be sampled, together with a decreased α in response. This provides enough approximation that near-optimal vectors can be solved with much less computation time. Additionally, the number of iterations required for convergence can be greatly reduced by choosing the gradient step sizes adaptively. For example, if $x^t_u$ denotes the value of $x_u$ at iteration t, and $g^t_{xu}$ denotes the gradient of $x_u$ at iteration t, then at iteration t the following update to $x_u$ can be performed:

$$x_u^i = x_u^{i-1} + \frac{\gamma g_u^i}{\sqrt{\sum_{i'=1}^{i} g_u^{i'2}}}$$

Each iteration of the alternating gradient descent procedure includes computing the gradient for all latent factor vectors, and then taking a step towards the positive direction of the gradient. Each of these gradients includes sum of a set of functions that each depend on a single user and item.

In accordance with an embodiment, the process can be adapted for parallel processing and for scale, including sharding the observation matrix and vectors into partitions, working locally with each partition using a data collection and aggregation processor, such as an Apache Hadoop environment, and then joining or otherwise combining the results of each partition.

Figure 3:
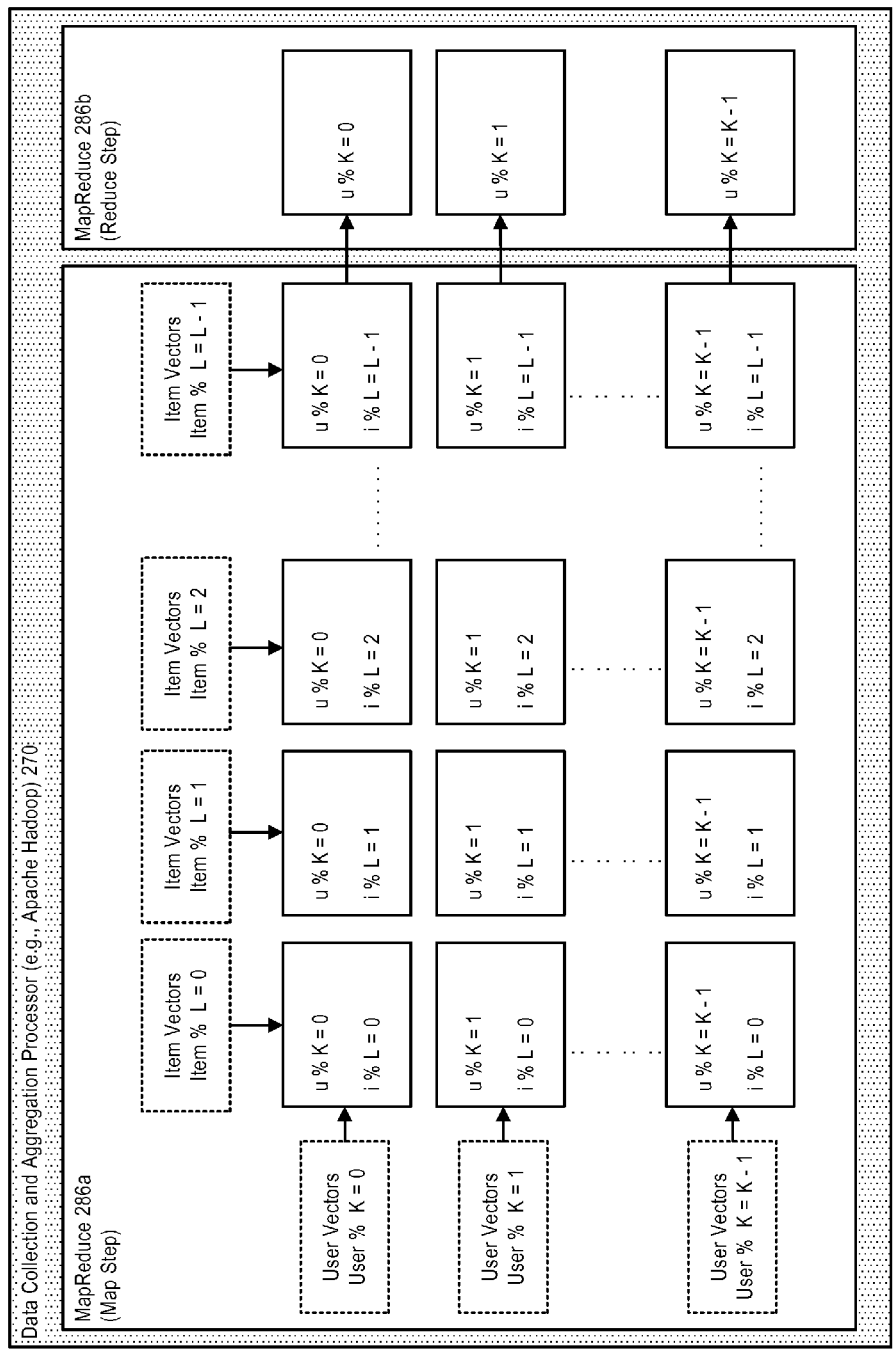
FIG. 3 illustrates the use of sharding, in accordance with an embodiment.

FIG. 3 illustrates the use of sharding, in accordance with an embodiment. As shown in FIG. 3, the system can employ a sharding technique to shard the observation matrix R, in which R is first partitioned into K×L blocks of K rows and L columns, where K 140 n and L«m are parallelization factors. Additionally, the user X matrix is partitioned into K blocks and the item Y matrix into L blocks. Each block depends on at most n/K users and m/L items, so even if the full observation matrix R and set of user and item matrices X and Y cannot fit in memory, parallelization factors K and L can be selected such that each block can fit in memory.

In accordance with an embodiment, in the map phase, all observations $r_{ui}$, user vectors $x_u$, and item vectors $y_i$ from the same block are provided to the same mapper. For each pair of users and items (u and i), the following is computed in parallel:

$$v_{ui} = \alpha r_{ui} y_i - \frac{y_i(1 + \alpha r_{ui})\exp(x_u y_i^T + \beta_u + \beta_i)}{1 + \exp(x_u y_i^T + \beta_u + \beta_i)}$$

$$b_{ui} = \alpha r_{ui} - \frac{(1 + \alpha r_{ui})\exp(x_u y_i^T + \beta_u + \beta_i)}{1 + \exp(x_u y_i^T + \beta_u + \beta_i)}$$

In accordance with an embodiment, in the reduce phase, the system can key off u (or off i if performing an item iteration), such that each $v_{ui}$ and $b_{ui}$ that map to the same user u (or to the same item i if performing an item iteration) are sent to the same reducer. It follows that $\partial/\partial x_u = \Sigma_i v_{ui}$, and $\partial/\partial \beta_u = \Sigma_i b_{ui}$ and so these summations can be efficiently aggregated in parallel in the reduce phase. Finally, once the partial derivatives $\partial/\partial x_u$ and $\partial/\partial \beta_u$ have been computed, the system can update $x_u$ and $\beta_u$.

Figure 4:
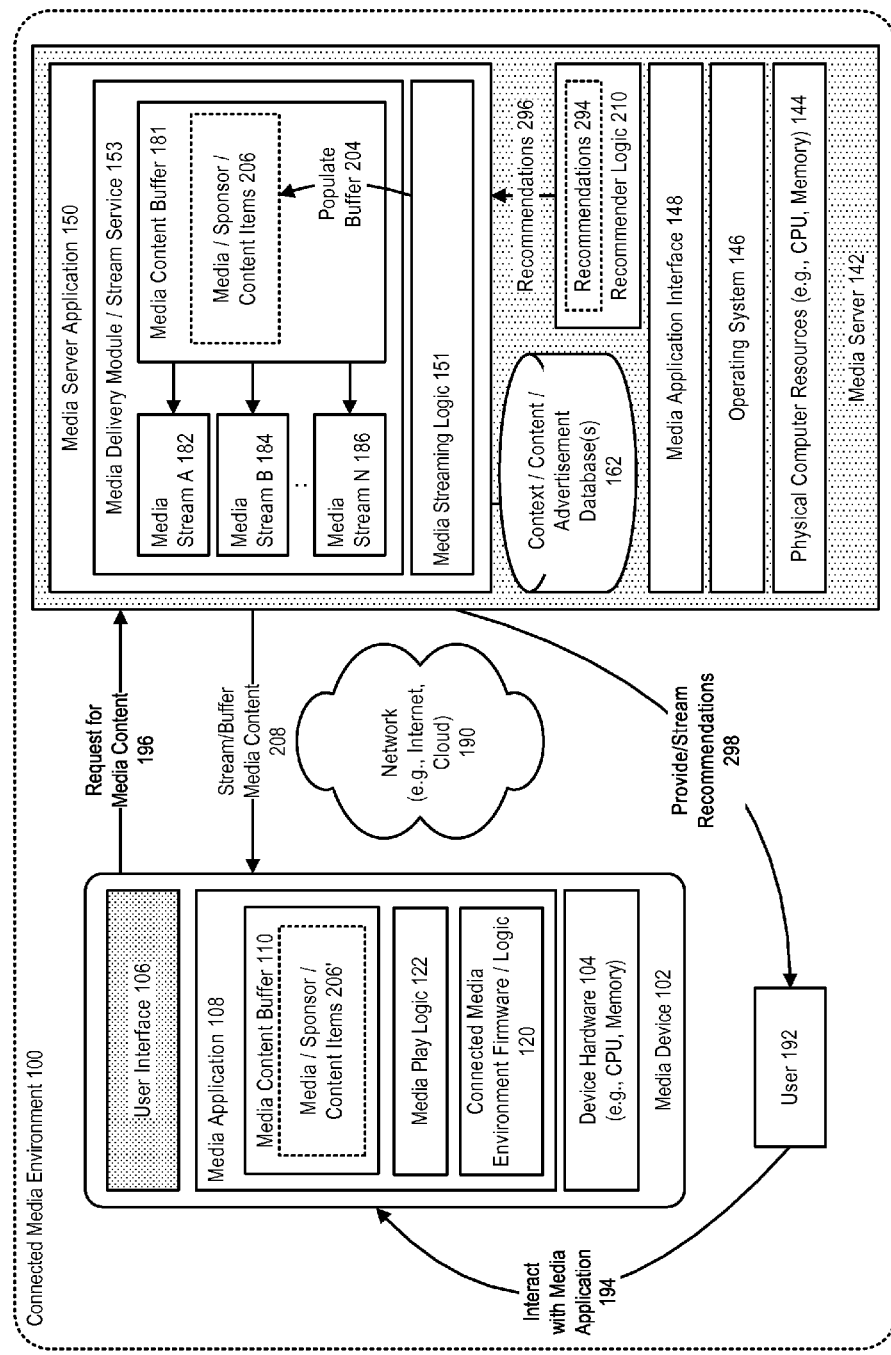
FIG. 4 illustrates providing of recommendations, in accordance with an embodiment.

FIG. 4 illustrates providing of recommendations, in accordance with an embodiment. As shown in FIG. 4, a recommender logic can use the recommendations 294 determined according to the implicit factorization technique and provide 296 the recommendations to the media server application, so that they can be provided or streamed 298 to users as appropriate.

Figure 5:
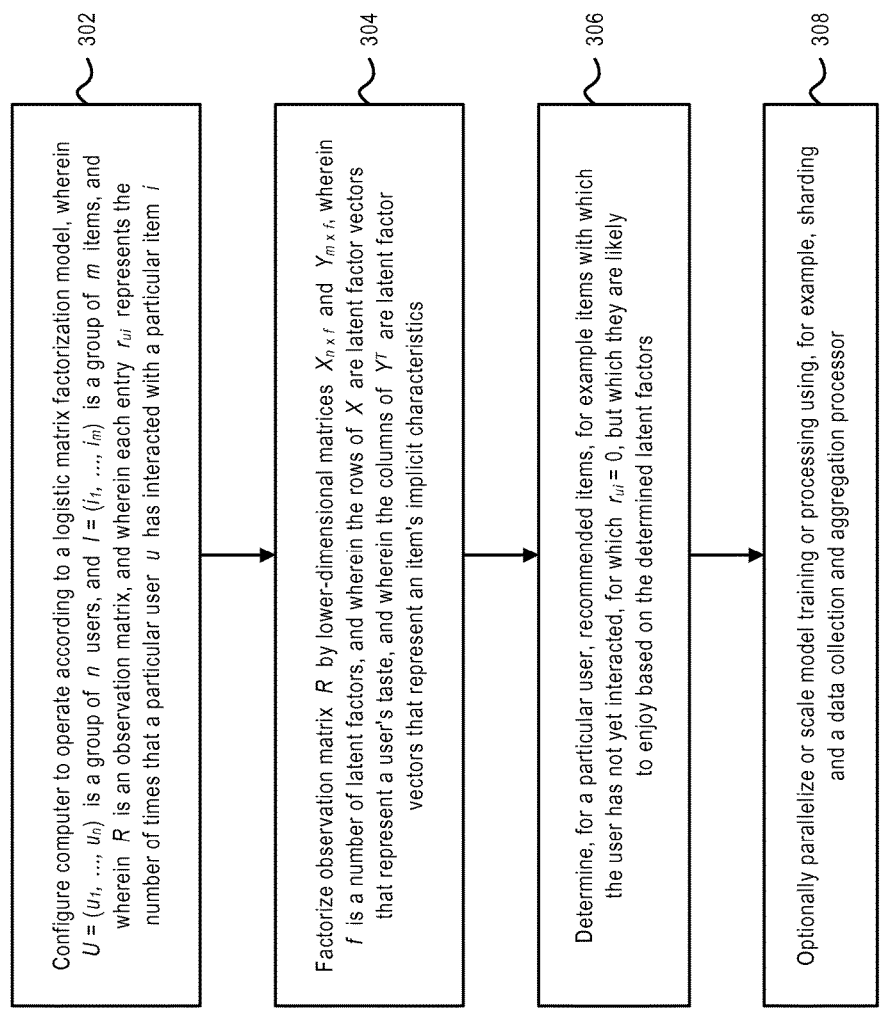
FIG. 5 illustrates a method of providing logistic matrix factorization for implicit feedback data, in accordance with an embodiment.

FIG. 5 illustrates a method of providing logistic matrix factorization for implicit feedback data, in accordance with an embodiment. As shown in FIG. 5, at step 302, a logistic matrix factorization model is generated, wherein U=$(u_1, \ldots, u_n)$ is a group of n users, and I=$(i_1, \ldots, i_m)$ is a group of m items, and wherein R is an observation matrix, and wherein each entry in the observation matrix $r_{ui}$ represents the number of times that a particular user u has interacted with a particular item i.

At step 304, an observation matrix R is factorized by lower-dimensional matrices $X_{n \times f}$ and $Y_{m \times f}$, wherein f is a number of latent factors, and wherein the rows of X are latent factor vectors that represent a user's taste, and wherein the columns of $Y^T$ are latent factor vectors that represent an item's implicit characteristics.

At step 306, for a particular user, recommended items are determined, for example items with which the user has not yet interacted, for which $r_{ui}=0$, but which they are likely to enjoy based on the latent factors.

At step 308, the method can optionally include parallelizing or scaling model training using, for example, sharding and a data collection and aggregation processor (e.g., an Apache Hadoop environment).

Example Results

The described approach was evaluated using a dataset of user listening behavior associated with a music streaming service and including usage data for |X|=50,000 active users, and the top |I|=10,000 most popular artists.

For each user, the number of times they listened to each artist in I was tracked over a period of time. A "listen" was defined as any continuous stream of an artist's song for more than 30 seconds, which removes the bias that results from users sampling artists that they end up not liking. For each user-item pair in U×I a tuple of the form (<user>, <artist>, <listens>) was created wherein <user>∈U, <artist>∈I, and $r_{ui}$=<listens>. In total, the observation matrix R contained 86 million non-zero entries and 414 million zero entries. Choosing α to balance the positive and negative observations yielded the best results.

A difficulty with evaluating collaborative filtering models with implicit feedback datasets is that the data only encodes positive feedback. If a user has not listened to a particular artist this does not necessarily mean that they dislike the artist, but could instead mean that they have never heard of the artist. However, if a user has listened to an artist a large number of times then this is a strong positive signal that the user likes that artist. Due to the lack of negative feedback, a recall-based evaluation metric Mean Percentage Ranking (MPR) can be used to evaluate a user's satisfaction with an ordered list of recommended items.

A uniform random subset of 10% of the entries in R was selected as a test set ($R_{test}$) having entries $r^i_{ui}$, and the system trained on the remaining 90%. Removing random entries in R, instead of random listens, avoids the bias that users will tend to revisit the same artists. By removing full entries, the dataset consists of user-item pairs for which the training set has no listening data, which more closely reflects the use case of predicting top new items for a user, rather than those top items the user has already interacted with.

For each user $u \in U$ a ranked list of the items in I was generated and sorted by preference. A $rank_{ui}$ denoted the percentile ranking of item i for user u, wherein a $rank_{ui}=0\%$ signified that i is predicted as the highest recommended item for u; while a $rank_{ui}=100\%$ signified that i is predicted as the lowest recommended item for u. The percentile ranking is then evenly distributed among the remaining items in the list by steps of 100%/|I|. The MPR expected percentile ranking of a user listening to the artists in the test set can be defined as:

$$MPR = \frac{\sum_{ui} r^i_{ui} rank_{ui}}{\sum_{ui} r^i_{ui}}$$

Lower values of MPR are more desirable as they indicate that the user listened to artists higher in their predicted lists. Conversely, higher values of MPR indicate that users listened to artists lower in their predicted lists. Randomly produced lists would have an expected MPR of 50%.

The model was evaluated using the MPR evaluation metric for different numbers of latent factors ranging from 5 to 100. An Implicit Matrix Factorization (IMF) model was also implemented for the same set of varying latent factors. Both models were run until the change in MPR was minimal, amounting to around 10-20 iterations for IMF and 30-40 iterations for logistic matrix factorization, depending on the number of latent factors. A popularity baseline was also evaluated in which all ranked lists were based on the globally most popular artists over the training period, and which achieved an MPR of 14.9%, already an improvement over a purely random model.

Both logistic matrix factorization and IMF eventually converged to a similar MPR at around 100 latent factors (6.27 for IMF and 5.99 for logistic matrix factorization). The improved performance of logistic matrix factorization comes from its ability to outperform IMF with fewer number of latent factors. For example, using just 10 latent factors IMF achieved an MPR of 16.9% which is just above the popularity baseline; while logistic matrix factorization achieved an MPR of 8.065%. The ability to perform well using less latent factors is a desirable characteristic since, as the number of latent factors increases, more training data is needed to effectively learn near optimal vectors—in situations where there is insufficient amounts of training data, increasing the number of latent factors may not yield performance improvements. Additionally, some recommendation techniques, such as nearest-neighbor search require maintaining a data structure such as a k-d tree in memory, and the size of these data structures is proportional to the number of items as well as the dimensionality of the latent factors.

In addition to the quantitative evaluation described above, a qualitative analysis was performed. One of the benefits to using latent factor models is that it places all items in I into a lower-dimensional space where similarities can be computed between items. A cosine similarity can be used to measure the similarity between item vectors in a latent factor space, for example given two vectors a and b, the cosine similarity between the vectors is defined as:

$$sim_{ab} = \frac{\sum_i a_i b_i}{\sqrt{\sum_i a_i^2} \sqrt{\sum_i b_i^2}}$$

The top related items for a given item a can be defined as the top items $b \in I$ ranked by $sim_{ab}$. Both logistic matrix factorization and IMF were trained using the same listening history dataset and 60 latent factors, and the top related items were computed for several artists in I using the learned item vectors. Qualitatively, the logistic matrix factorization was able to successfully capture a music sentiment, for use in choosing complimentary music and artists.

Example Software Implementation

In accordance with an embodiment, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

FIG. 6A-6C illustrates an example software code 310 for enabling logistic matrix factorization for implicit feedback data, in accordance with an embodiment. As shown in FIG. 6A-6C, the example software code reflects the above steps, including that the user and item vectors can be initially configured with random noise, and an alternating gradient ascent procedure performed, including alternating between solving for the vectors while modifying the observation matrix according to a gradient. During each iteration, the system can solve for item vectors using solved user vectors, and solve for user vectors using solved item vectors. After completing a number of iterations, latent factors can be determined for users and items. The latent factors can then be used to determine recommendations, for example one or more items for a user with which they have not yet interacted, but which they are likely to enjoy based on the latent factors.

The software code illustrated in FIG. 6A-6C is provided by way of example, in accordance with a particular embodiment. In accordance with other embodiments, other types of software code can be used.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of embodiments of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for use of logistic matrix factorization of implicit feedback data in determination and communication of media content item recommendations, comprising:
   one or more computers, each of which includes a processor and a memory, and a media server provided thereon that includes access points that receive requests from media devices to access media content at the media server;
   wherein in response to receiving, via the access points, the requests from the media devices to access the media content at the media server, the media server collects a usage data describing usage by a plurality of users, of a plurality of media content items, wherein the usage data is provided as an observation matrix, wherein each entry in the observation matrix represents a number of times that a particular user of a media device has interacted with a particular media content item;
   a data collection and aggregation processor that applies a logistic function to determine latent factors that indicate a likelihood of particular users to prefer particular media content items, including
      factorizing the observation matrix of usage data by lower-dimensional matrices representing, respectively a user's taste, and a media content item's implicit characteristics, and
      determining one or more probabilities that the particular users will interact with the particular media content items; and
   wherein the media server, for a particular user of a media device:
      receives an indication of the latent factors that indicate the likelihood of the particular users to prefer the particular media content items,
      determines, for the particular user, recommended media content items, based on the latent factors, and communicates an indication of the recommended media content items to the particular user's media device.

2. The system of claim 1, wherein the system is used with a media environment or streaming service that enables streaming of media content items from a media server to a media device.

3. The system of claim 2, wherein the media content items are songs, music, movies, or other media content items; and wherein the implicit characteristics includes one or more of a style or genre of the songs, music, movies, or other media content items.

4. The system of claim 1, wherein the logistic function is trained using parallel processing by sharding the observation matrix, and user and item blocks.

5. The system of claim 1, wherein the system includes a plurality of media servers, each of which plurality of media servers including one or more access points that receive requests from media devices, and communicate indications of recommended media content items to the media devices, wherein the plurality of media servers communicate their usage data to the data collection and aggregation processor, to provide the observation matrix.

6. The system of claim 1, wherein indications of recommended media content items are provided to the media devices as playlists of the recommended media content items.

7. The system of claim 1, wherein the usage data is collected in response to determining interactions with a media application playlist or a search function to retrieve, play, stream, or otherwise request media content items, which usage data is then provided to the data collection and aggregation processor.

8. The system of claim 1, wherein the media server includes:
   a media application interface that receives the requests from the media devices;
   a context database that stores data associated with the presentation of media content by particular media devices; and
   a media streaming logic that retrieves or otherwise provides the access to the media content items, in response to the requests from the media devices, and populates a media content buffer with streams of corresponding media content data, which are then returned to a requesting device or a controlled device.

9. The system of claim 1, wherein each media device includes a user interface which is adapted to display media options and to determine a user interaction or input to download, stream, or otherwise access a corresponding particular media content item.

10. A method for use of logistic matrix factorization of implicit feedback data in determining and communicating media content item recommendations, comprising:
    providing, at one or more computers, each of which includes a processor and a memory, a media server that includes access points that receive requests from media devices to access media content at the media server;
    in response to receiving, via the access points, the requests from the media devices to access the media content at the media server, collecting by the media server a usage data describing usage by a plurality of users, of a plurality of media content items, wherein the usage data is provided as an observation matrix, wherein each entry in the observation matrix represents a number of times that a particular user of a media device has interacted with a particular media content item;
    processing the observation matrix including the usage data by a data collection and aggregation processor, including applying a logistic function to determine latent factors that indicate a likelihood of particular users to prefer particular media content items, including
       factorizing the observation matrix of usage data by lower-dimensional matrices representing, respectively a user's taste, and a media content item's implicit characteristics, and determining one or more probabilities that the particular users will interact with the particular media content items;

receiving at the media server an indication of the latent factors that indicate the likelihood of the particular users to prefer the particular media content items;

determining, for a particular user, recommended media content, based on the latent factors; and communicating an indication of the recommended media content items to the particular user's media device.

11. The method of claim 10, wherein the method is used with a media environment or streaming service that enables streaming of media content items from a media server to a media device.

12. The method of claim 11, wherein the media content items are songs, music, movies, or other media content items; and wherein the implicit characteristics includes one or more of a style or genre of the songs, music, movies, or other media content items.

13. The method of claim 10, wherein the logistic function is trained using parallel processing by sharding the observation matrix, and user and item blocks.

14. The method of claim 10, wherein the method is performed by a plurality of media servers, each of which plurality of media servers including one or more access points that receive requests from media devices, and communicate indications of recommended media content items to the media devices, wherein the plurality of media servers communicate their usage data to the data collection and aggregation processor, to provide the observation matrix.

15. The method of claim 10, wherein indications of recommended media content items are provided to the media devices as playlists of the recommended media content items.

16. A non-transitory computer readable storage medium, including instructions stored thereon which when read and executed by one or more computers cause the one or more computers to perform the method comprising:

providing, at one or more computers, each of which includes a processor and a memory, a media server that includes access points that receive requests from media devices to access media content at the media server;

in response to receiving, via the access points, the requests from the media devices to access the media content at the media server, collecting by the media server a usage data describing usage by a plurality of users, of a plurality of media content items, wherein the usage data is provided as an observation matrix, wherein each entry in the observation matrix represents a number of times that a particular user of a media device has interacted with a particular media content item;

processing the observation matrix including the usage data by a data collection and aggregation processor, including applying a logistic function to determine latent factors that indicate a likelihood of particular users to prefer particular media content items, including factorizing the observation matrix of usage data by lower-dimensional matrices representing, respectively a user's taste, and a media content item's implicit characteristics, and determining one or more probabilities that the particular users will interact with the particular media content items;

receiving at the media server an indication of the latent factors that indicate the likelihood of the particular users to prefer the particular media content items;

determining, for a particular user, recommended media content, based on the latent factors; and communicating an indication of the recommended media content items to the particular user's media device.

17. The non-transitory computer readable storage medium of claim 16, wherein the method is used with a media environment or streaming service that enables streaming of media content items from a media server to a media device.

18. The non-transitory computer readable storage medium of claim 17, wherein the media content items are songs, music, movies, or other media content items; and wherein the implicit characteristics includes one or more of a style or genre of the songs, music, movies, or other media content items.

19. The non-transitory computer readable storage medium of claim 16, wherein the logistic function is trained using parallel processing by sharding the observation matrix, and user and item blocks.

20. The non-transitory computer readable storage medium of claim 16, wherein the method is performed by a plurality of media servers, each of which plurality of media servers including one or more access points that receive requests from media devices, and communicate indications of recommended media content items to the media devices, wherein the plurality of media servers communicate their usage data to the data collection and aggregation processor, to provide the observation matrix.

* * * * *